United States Patent [19]

Lindner et al.

[11] Patent Number: 4,656,227
[45] Date of Patent: Apr. 7, 1987

[54] THERMOPLASTIC MOULDING COMPOSITIONS BASED ON POLYALKYLENE TEREPHTHALATE, POLYCARBONATE AND ADDITIONAL POLYMER AND A PROCESS FOR THE PRODUCTION THEREOF

[75] Inventors: Christian Lindner, Cologne; Karl-Heinz Ott, Leverkusen; Werner Nouvertné, Krefeld; Peter R. Müller, Leverkusen, all of Fed. Rep. of Germany

[73] Assignee: Bayer Aktiengesellschaft, Leverkusen, Fed. Rep. of Germany

[21] Appl. No.: 731,931

[22] Filed: May 8, 1985

[30] Foreign Application Priority Data

May 19, 1985 [DE] Fed. Rep. of Germany ....... 3418750

[51] Int. Cl.$^4$ ................................................ C08F 8/00
[52] U.S. Cl. ...................................... 525/133; 523/335; 525/67; 525/68; 525/88; 525/148; 525/166; 525/176; 525/177
[58] Field of Search ....................... 525/67, 72, 68, 88, 525/133, 148, 166, 176, 177; 523/335

[56] References Cited

U.S. PATENT DOCUMENTS

| | | | |
|---|---|---|---|
| 3,671,487 | 6/1972 | Abolins | 525/165 |
| 3,673,278 | 6/1972 | Bialows | 525/148 |
| 3,864,428 | 2/1975 | Nakamura et al. | 525/310 |
| 4,264,487 | 4/1981 | Fromuth et al. | 525/138 |

*Primary Examiner*—Jacob Ziegler
*Attorney, Agent, or Firm*—Connolly and Hutz

[57] ABSTRACT

Moulding compositions based on polyalkylene terephthalate, polycarbonate, polymer and fluorinated polyolefin have higher Vicat-softening temperature if the polymer and the fluorinated polyolefin are precipitated together from a mixture of the dispersions of both components.

6 Claims, No Drawings

THERMOPLASTIC MOULDING COMPOSITIONS BASED ON POLYALKYLENE TEREPHTHALATE, POLYCARBONATE AND ADDITIONAL POLYMER AND A PROCESS FOR THE PRODUCTION THEREOF

This invention relates to thermoplastic moulding compositions consisting of polyalkylene terephthalate, aromatic polycarbonate and additional polymer with a glass transition temperature below −20° C., which polymer partially consists of fluorinated polyolefin, and a process for the production of these moulding compositions.

Moulding compositions based on polyalkylene terephthalate, aromatic polycarbonate and additional polymer have excellent mechanical properties (DE-PS No. 23 43 609=U.S. Pat. No. 3,864,428; DE-OS No. 1 18 526, 1 18 697; European published patent application No. 20 605≙U.S. Pat. No. 4,257,937, European published patent application No. 25 920≙U.S. Pat. No. 4,264,487).

Practical use has shown that the mouldings produced from known moulding compositions are not invariably suitable for use in hot surroundings, such as in the engine compartment of motor vehicles, as they soften prematurely.

It is known from DE-OS No. 6 94 217 that polyesters, such as polyalkylene terephthalate, with addition of from 0.05 to 25 % by weight of polytetrafluoroethylene have higher rates of crystalline growth and therefore have greater dimensional stability and facilitate shorter cycle time.

DE-OS No. 22 21 772 describes glass-fibre-reinforced flame-resistant polyesters, such as polyethylene- or -butylene terephthalates, which do not drip in fire owing to the addition of 0.5 to 2.5 of polytetrafluoroethylene and require a smaller quantity of flame-proofing agent owing to the synergism between the polytetrafluoroethylene and the flame-proofing agent. Polycarbonates, to which 0.1 to 3% of polytetrafluoroethylene have been added, are known from U.S. Pat. No. 3,673,278, which polycarbonates have increased flame-resistance and do not drip in fire. Furthermore, such polycarbonates have excellent surfaces and do not discolour despite deformation at elevated temperature.

However, the problem discussed above is not dealt with in any of the above publications, and consequently their disclosure does not resolve this considerable problem, the important solution of which is sought by the art.

An object of the present invention is to provide polyalkylene terephthalate/polycarbonate/polymer moulding compositions having a higher softening temperature (according to Vicat), without substantially impairing the excellent mechanical properties thereof.

This object has surprisingly been achieved by using a polymer which partially consists of fluorinated polyolefin and is obtained by mutual coagulation of different latices.

Accordingly the present invention provides thermoplastic moulding compositions comprising of A. from 1 to 99, preferably from 1 to 80, more particularly from 30 to 60, parts by weight of polyalkylene terephthalate, B. from 1 to 99, preferably from 20 to 99, more particularly from 40 to 70, parts by weight of aromatic polycarbonate and C. from 1 to 30, preferably from 3 to 20, more particularly from 5 to 2, parts by weight of polymer, characterised in that the polymer C consists of at least one polymer with a glass transition temperature below −20° C. and—based on the moulding composition A+B+C—of from 0.015 to 0.8, preferably from 0.2 to 0.8% by weight of fluorinated polyolefin and is obtained by mixing aqueous dispersions of the fluorinated polyolefin and the polymer, having a glass transition temperature below −20° C., and by mutual coagulation.

A further object of the present invention is a process for the production of the above moulding compositions, according to which aqueous dispersions of at least one fluorinated polyolefin and at least one polymer having a glass transition temperature below −20° C. are firstly mixed, then coagulated together, isolated, dried and optionally mixed, after granulation or crushing, with the molten components A and B.

Polyalkylene terephthalates A are, in the context of the present invention, reaction products of aromatic dicarboxylic acids or the reactive derivates thereof (e.g. dimethyl esters) and aliphatic, cycloaliphatic or araliphatic diols and mixtures of these reaction products.

Preferred polyalkylene terephthalates A may be produced by known methods from terephthalic acid (or the reactive derivatives thereof) and aliphatic or cycloaliphatic diols having from 2 to 10 carbon atoms (Kunststoff-Handbuch, Vol. VIII, P. 695 et seq. Carl Hanser Verlag, Munich, 1973).

Preferred polyalkylene terephthalates A contain at least 80, preferably at least 90 mol %, based on the dicarboxylic acid component, of terephthalic acid radicals and at least 80, preferably at least 90 mol % based on the diol component, of ethylene glycol and/or butane-1,4-diol radicals.

The preferred polyalkylene terephthalates A may contain up to 20 mol %, preferably up to 10 mol %, of other aliphatic diols having from 3 to 12 carbon atoms or cycloaliphatic diols having from 6 to 21 carbon atoms, such as radicals of propane-1,3-diol, 2-ethyl propane -1,3-diol, neopentyl glycol, pentane-1,5-diol, hexane -1,6-diol, cyclohexane-1,4-dimethanol, 3-ethyl-pentane -2,4-diol, 2-methyl-pentane-2,4-diol, 2,2,4-trimethylpentane-1,3- and -1,6-diol, 2-ethyl-hexane -1,3-diol, 2,2-diethyl-propane-1,3-diol, hexane -2,5- diol,1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxy ethoxyphenyl)-propane and 2,2-bis-(4-hydroxypropoxyphenyl)-propane (DE-OS Nos. 24 07 674, 24 07 776, 27 15 932) in addition to ethylene glycol or butane-1,4-diol radicals.

The polyalkylene terephthalates A may be branched by incorporation of relatively small quantities of tri- or tetra-hydric alcohols or tri- or tetra-basic carboxylic acids, as are described for, example, in DE-OS No. 19 00 270 and U.S. Pat. No. 3,692,744. Examples of preferred branching agents are trimesic acid, trimellitic acid, trimethylol ethane and -propane, and pentaerythritol.

Polyalkylene terephthalates A which are produced solely from terephthalic acid and the reactive derivatives thereof (such as the dialkyl esters thereof) and ethylene glycol and/or butane-1,4-diol and from mixtures of these polyalkylene terephthalates, are particularly preferred.

The polyalkylene terephthalates preferably used as component A generally have an intrinsic viscosity of from 0.4 to 1.5 dl/g, preferably from 0.5 to 1.3 dl/g, more particularly from 0.6 to 1.2 dl/g, in each case measured in phenol/o-dichlorobenzene (1:1 parts by weight) at 25° C.

Aromatic polycarbonates B are to be understood, in the context of the present invention, as designating homopolycarbonates, copolycarbonates and mixtures of these polycarbonates which are based, for example, on at least one of the following diphenols:
hydroquinone,
resorcinol,
dihydroxydiphenyls,
bis-(hydroxyphenyl)-alkanes,
bis-(hydroxyphenyl)-cycloalkanes
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl-sulphones, and
$\alpha, \alpha'$-bis-(hydroxyphenyl)-diisopropyl benzenes,
and the nuclear-alkylated and nuclear-halogenated derivatives thereof. The above and further suitable diphenols are described, for example, in U.S. Pat. Nos. 3,028,365, 3,275,601, 3,148,172, 3,062,781, 2,991,273, 3,271,367, 2,999,835, 2,970,131 and 2,999,846, in DE-OS Nos. 1 570 703, 2 063 050, 2 063 052, 2 211 956, 2 211 957, FR-PS No. 1 561 518 and in the monograph by H. Schnell, "Chemistry and Physics of Polycarbonates", Interscience Publishers, New York, 1964.

The following are examples of preferred diphenols:
4,4'-dihydroxydiphenyl,
2,4-bis-(4-hydroxyphenyl)-2-methyl butane,
$\alpha, \alpha'$-bis-(4-hydroxyphenyl)-p-diisopropyl benzene
2,2-bis-(3-methyl-4-hydroxyphenyl)-propane, and
2,2-bis-(3-chloro-4-hydroxyphenyl)-propane.
The following are examples of particularly preferred diphenols:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)propane, and
1,1-bis-(4-hydroxyphenyl)-cyclohexane.

The aromatic polycarbonates B may be branched by the incorporation of small quantities, preferably from 0.05 to 2.0 mol % (based on the diphenols used), of tri- or more than tri-functional compounds, for example those compounds having 3 or more than 3 phenolic hydroxyl groups.

The aromatic polycarbonates B generally have an average molecular weight $M_w$ of from 10,000 to 200,000, preferably from 20,000 to 80,000, determined by light scattering.

Chain terminators, such as phenol, phenol halides or alkylphenols may be used in a known manner in the calculated quantities to adjust the molecular weight $M_w$ of the polycarbonates B.

Polymers C include copolymers—more particularly graft copolymers—having rubber-elastic properties, which are substantially produced from at least 2 of the following monomers: chloroprene, 1,3-butadiene, isoprene, styrene, acrylonitrile, ethylene, propylene, vinyl acetate and (meth)acrylic acid esters having from 1 to 18 carbon atoms in the alcohol component; therefore this includes polymers, as are described, for example, in "Methoden der Organischen Chemie" (Houben-Weyl), Vol. 14/1, Georg Thieme Verlag, Stuttgart 1961, pages 393–406 and in C. B. Bucknall, "Toughened Plastics", Appl. Science Publishers, London 1977. Preferred polymers C are at least partically cross-linked and have gel contents of more than 20, preferably more than 40% by weight, and more particularly more than 60% by weight.

Preferred polymers C are ethylene/vinyl acetate copolymers having from 15 to 60% by weight of vinyl acetate radicals, with non-flowable melt indices of up to 1000, and preferably from 0.1 to 20, measured at 190° C. and with 2.16 kg stress according to DIN 53735.

Preferred polymers C are, for example, the so-called EPM or EPDM rubbers, in which the weight ratio of ethylene to propylene radicals is from 40:60 to 65:35.

The Mooney viscosity ($ML_{1-4}/100°$ C.) of the EPM or EPDM rubbers may be from 25 to 200, preferably from 35 to 120.

The ethylene/propylene copolymers (EPM) used have almost no double bonds while the ethylene/propylene/diene-terpolymers (EPDM) may have from 1 to 20 double bonds/1000 carbon atoms. The following are examples of suitable diene monomers in EPDM: conjugated dienes, such as isoprene and 1,3-butadiene and unconjugated dienes having from 5 to 25 carbon atoms, such as 1,4-pentadiene, 1,4-hexadiene, 1,5-hexadiene, 2,5-dimethyl-1, 5-hexadiene and 1,4-octadiene; cyclic dienes, such as cyclopentadiene, cyclohexadiene, cyclooctadiene and dicyclopentadiene; alkenyl norbornenes, such as 5-ethylidene-2-norbornene, 5-butylidene-2-norbornene, 2-methallyl-5-norbornene, 2-isopropenyl-5-norbornene and tricyclodienes.

The unconjugated dienes 1,5-hexadiene, ethyldienenorbornene or dicyclopentadiene are preferred. The diene content of the EPDM is preferably from 0.5 to 10% by weight. EPM or EPDM rubbers of this type are described, for example, in DE-OS No. 28 08 709.

Preferred polymers C are also selectively-hydrogenated block copolymers of a vinylaromatic monomer (X) and a conjugated diene (Y). Such block copolymers are known. The technology used for the production of styrene-diene-block copolymers which is described in "Encyclopedia of Polymer Science and Technology", Vol. 15, Interscience, N.Y. (1971) on pages 508 et seq is the technology generally used for the production of the suitable block copolymers from styrene, $\alpha$-methyl styrene, vinyl toluene etc. and from conjugated dienes such as butadiene and isoprene etc. The selective hydrogenation may be carried out in a known manner, the ethylenic double bonds essentially being completely hydrogenated, the aromatic double bonds remaining substantially unaffected. Selectively-hydrogenated block copolymers of this type are described, for example, in DE-OS No. 30 00 282.

Preferred polymers C are, for example, polybutadienes which have been grafted with styrene and/or acrylonitrile, and/or (meth)acrylic acid alkyl esters, butadiene/styrene copolymers and acrylate rubbers; that is copolymers of the type described in DE-OS No. 16 94 173 (=U.S. Pat. No. 3,564,077); polybutadienes which have been grafted with acrylic or methacrylic acid alkyl esters, vinyl acetate, acrylonitrile styrene and/or alkyl styrenes, butadiene/styrene or butadiene/acrylonitrile copolymers, polyisobutenes or polyisoprenes as are described, for example, in DE-OS No. 23 48 377(=U.S. Pat. No. 3,919,353).

Polymers C which are particularly preferred are, for example, ABS polymers, as are described, for example, in DE-OS No. 20 35 390 (=U.S. Pat. No. 3,644,574) or in DE-OS No. 22 48 242 (=GB-PS No. 1 409 275).

Polymers C which are particularly preferred are graft polymers which are obtained by the graft reaction of I. from 10 to 70, preferably from 15 to 50, more particularly from 20 to 40% by weight, based on graft product, of at least one (meth)acrylic acid ester or from 10 to 70, preferably from 15 to 50, more particularly from 20 to 40% by weight of a mixture consisting of from 10 to 50, preferably from 20 to 35% by weight, based on the mixture, of acrylonitrile or (meth)acrylic acid ester and from 50 to 90, preferably from 65 to 80% by weight, based on the mixture, of styrene; onto II. from 30 to 90, preferably from 50 to 85, more particularly from 60 to 80% by weight, based on the graft product, of a butadiene polymer having at least 50% by weight, based on II, of butadiene radicals as the graft base, the gel proportion of the graft base II being at least 70% by weight (measured in toluene), the degree of grafting G being from 0.15 to 0.55 and the average particle diameter $d_{50}$ of the graft polymer C being from 0.1 to 2, preferably from 0.2 to 0.6 μm.

(Meth)acrylic acid esters I are esters of acrylic acid or methacrylic acid and monohydric alcohols having from 1 to 8 carbon atoms. Methacrylic acid methyl esters, ethyl esters and propyl esters are particularly preferred.

The graft base II may contain up to 50% by weight, based on II, of radicals of other ethylenically unsaturated monomers, such as styrene, acrylonitrile, esters of acrylic or methacrylic acid having from 1 to 4 carbon atoms in the alcohol component (such as methyl acrylate, ethyl acrylate, methyl methacrylate, ethyl methacrylate), vinyl esters and vinyl ethers, in addition to butadiene radicals. The preferred graft base II consists of pure polybutadiene.

As it is known for the graft monomers I to not necessarily be completely grafted on to the graft base II during the graft reaction, graft polymers C are to be understood according to the present invention, to also designate those products which are obtained by polymerising monomers I in the presence of the bases II.

The degree of grafting G designates the weight ratio of grafted graft monomers to the graft base and is non-dimensional.

The average particle size $d_{50}$ is the diameter, above and below which 50% by weight of the particles lie in each case. It may be determined using ultracentrifuge measurements (W. Scholtan, H. Lange, Kolloid. Z. and Z. Polymere 250 (1972), 782-796) or by electron microscopy and subsequent counting of the particles (G. Kämpf, H. Schuster, Angew. Makromolekulare Chemie 14, (1970), 111-129) or by using light scattering measurements.

Polymers C which are particularly preferred are, for example, also graft polymers consisting of (a) from 20 to 90% by weight, based on C, of acrylate rubber having a glass transition temperature below $-20°$ C. as the graft base and (b) from 10 to 80% by weight, based on C, of at least one polymerisable ethylenically unsaturated monomer, the homo- or copolymers of which monomer, or monomers, produced in the absence of (a) having a glass transition temperature about 25° C., as graft monomers.

The acrylate rubbers (a) of polymers C are preferably polymers of acrylic acid alkyl esters, optionally having up to 40% by weight, based on (a), of other polymerisable ethylenically unsaturated monomers. The preferred polymerisable acrylic acid esters include $C_1-C_8$ alkyl esters, for example, methyl, ethyl, butyl, octyl and 2-ethylhexyl esters; alkyl halide esters, preferably halogen-$C_1-C_8$ alkyl esters, such as chloro-ethyl acrylate; and mixtures of these monomers.

The acrylate rubbers (a) may be non-cross linked or cross-linked, preferably partially cross-linked.

Monomers having more than one polymerisable double bond may be copolymerised for cross-linking. Preferred examples of cross-linking monomers are esters of unsaturated monocarboxylic acids having from 3 to 8 carbon atoms and unsaturated monohydric alcohols having from 3 to 12 carbon atoms or saturated polyols having from 2 to 4 OH groups and from 2 to 20 carbon atoms, such as ethylene glycol dimethacrylate and allyl methacylate; multiple unsaturated heterocyclic compounds, such as trivinyl- and triallyl-cyanurate; polyfunctional vinyl compounds, such as di- and tri-vinyl benzenes; but also triallyl phosphate and diallyl phthalate.

Preferred cross linking monomers are allyl methacrylate, ethylene glycol dimethacrylate, diallyl phthalate and heterocyclic compounds which have at least 3 ethylenically-unsaturated groups.

Particularly preferred cross-linking monomers are the cyclic monomers triallylcyanurate, triallylisocyanurate, trivinylcyanurate, triacryloylhexahydro-s-triazine, and triallyl benzene.

The quantity of cross-linking monomers is preferably from 0.02 to 5, more particularly from 0.05 to 2% by weight, based on the graft base (a).

It is advantageous with cyclic cross-linking monomers having at least 3 ethylenically unsaturated groups to limit the quantity to less than 1% by weight of the graft base (a).

Preferred "other" polymerisable ethylenically unsaturated monomers which can optionally be used in addition to the acrylic acid esters to produce the graft base (a) are, for example, acrylonitrile, styrene, α-methyl styrene, acrylic amides, vinyl-$C_1-C_6$-alkyl ethers, methyl methacrylate, and butadiene. Acrylate rubbers which are preferred as the graft base (a) are emulsion polymers which have a gel content of at least 60% by weight.

The gel content of the graft base (a) is determined at 25° C. in dimethyl formamide (M. Hoffmann, H. Krömer, R. Kuhn, Polymeranalytik I and II, Georg Thieme Verlag, Stuttgart 1977).

The acrylate rubbers used as the graft base (a) may also be products containing a core, more particularly a cross-linked diene rubber core, consisting of one or more conjugated dienes, such as polybutadiene or a copolymer of a conjugated diene with an ethylenically unsaturated monomer, such as styrene and/or acrylonitrile as the core.

The proportion of the polydiene core in the graft base (a) may be from 0.1 to 80, preferably from 0.1 to 20% by weight, based on (a). The sheath and core may independently be non-cross linked, partially cross-linked or highly cross-linked.

Graft bases (a) which are particularly preferred for graft polymers (c) based on polyacrylic acid esters are summarized in the following:

1. Acrylic acid ester polymers and copolymers without a diene rubber core and

2. Acrylic acid ester polymers and copolymers which have a diene rubber core. Graft polymers (c) of this type are described, for example, in DE-OS Nos. 31 18 526 and 31 18 697.

The graft yield, that is the quotient of the quantity of grafted monomer (b) and the quality of graft monomer (b) used, is generally from 20 to 80% by weight. It may be determined as described by M. Hoffmann H. Krömer, and R. Kuhn, in Polymeranalytik, Vol. 1, Georg Thieme Verlag, Stuttgart 1977.

Preferred graft monomers (b) are α-methyl styrene, styrene acrylonitrile, methyl methacrylate or mixtures of these monomers. Preferred graft monomer mixtures are those mixtures of styrene and acrylonitrile with a weight ratio of from 90:10 to 50:50.

Such graft polymers C based on polyacrylic acid esters are described, for example, in DE-PS No. 24 44 584 (=U.S. Pat. No. 4,022,748) and in DE-OS No. 27 26 256 (=U.S. Pat. No. 4,096,202).

Graft monomers of this type which are particularly preferred are obtained if from 2 to 30, preferably from 2 to 25% by weight, based on C, of monomer (b) is grafted on to from 80 to 98, preferably from 85 to 97%, by weight, based on C, of the completely broken latex of a rubber or rubber-rich graft polymer (a) which has been suspended in water in the absence of a suspending agent (c.f. DE-OS No. 31 17 052).

Such a graft polymer C which has been produced in the absence of a suspending agent is distributable, as a constituent of the moulding compositions according to the invention, in the other resin components to produce an extremely small particle size, which remains relatively unchanged even after relatively long processing times at elevated temperature.

The fluorinated polyolefins C have a high molecular weight and have glass transition temperatures above −20° C., generally above 100° C., fluorine contents of from 59 to 76, preferably from 65 to 76, more particularly from 70 to 76% by weight and an average particle diameter $d_{50}$ of from 0.05 to 20 μm. Preferred fluorinated polyolefins C are polytetrafluoroethylene, polyvinyldene fluoride, tetrafluoroethylene/hexafluoropropylene and ethylene/tetrafluoroethylene copolymers. The fluorinated polyolefins are known (c.f. "Vinyl and Related Polymers") by Schildknecht, John Wiley & Sons, Inc., New York, 1952, pages 484–494; "Fluorpolymers" by Wall, Wiley-Interscience, John Wiley & Sons, Inc., New York, Vol 13, 1970, pages 623–654; "Modern Plastics Encyclopedia", 1970–1971 Vol 47, No. 10 A, October 1970, McGraw-Hill, Inc., New York, pages 134, 138 and 774; "Modern Plastics Encyclopedia", 1975–1976, October 1975, Vol 52, No. 10 A, McGraw-Hill, Inc., New York, pages 27, 28 and 472, and U.S. Pat. Nos. 3,671,487, 3,723,373 and 3,838,092).

Preferred dispersions of fluorinated polyolefin C have solids contents of from 30 to 70, more particularly from 50 to 60% by weight. The mixtures of dispersions of the polymer having a glass transition temperature below −20° C. and the fluorinated olefin may be conventionally worked-up, by methods such as spray drying, freeze drying or coagulation by means of an addition of organic or inorganic salts, acids, bases or organic water-miscible solvents, such as alcohols and ketones, preferably at a temperature of from 20° to 150° C., more particularly from 50° to 100° C. Drying may take place at a temperature of from 50° to 200° C., preferably from 70° to 150° C.

The weight ratio of polymer having a glass transition temperature below −20° C. and the fluorinated polyolefin may be from 80:20 to 99.9:0.1, more particularly from 90:10 to 99:1.

The moulding compositions according to the invention may contain up to 5% by weight, based on moulding composition A+ B+C, of ethylene homo- or copolymer to increase the resistance to petrol. The ethylene copolymers in this context are polyethylenes, the radicals of which consist of up to 30% by weight, based on the ethylene copolymer, of radicals of other copolymerisable monomers, in addition to ethylene radicals. Other copolymerisable monomers for the production of these ethylene copolymers are for example (meth)acrylic acid and the monomers listed above for the production of the graft base and the graft coating for polymer C.

The moulding compositions according to the present invention may contain conventional additives, such as lubricants and mould release agents, nucleating agents, stabilizers, fillers and reinforcers, flame-proofing agents and dyes.

The filled or reinforced moulding compositions may contain up to 60% by weight, based on the reinforced moulding composition, of fillers and/or reinforcing materials. Preferred reinforcing materials are glass fibres. Preferred fillers which may also have a reinforcing effect are glass beads, mica, silicates, quartz, talcum, titanium dioxide and wollastonite.

The polyester moulding compositions which have been provided with flame-proofing agents contain such flame-proofing agents in a concentration of generally less than 30% by weight, based on the flame-proofed moulding compositions.

All known flame-proofing agents may be used, such as polyhalo-diphenyl, polyhalo-diphenyl ethers, polyhalo-phthalic acid and the derivatives thereof and polyhalo- oligo- and -polycarbonates, the corresponding bromine compounds being particularly effective. Furthermore they generally contain a synergist, such as antimony trioxide. The parts given in the following Examples are parts by weight. Percentages relate to the weight.

EXAMPLES

I. Components used:
1. Polycarbonate consisting of bisphenol-A, phenol and phosgene, relative viscosity 1.285, measured in dichloromethane at 25° C. in 0.5% solution, and provided with phosphite-stabilisers at a concentration of 0.1% by weight.
2. Polybutylene terephthalate having an intrinsic viscosity of 1.18 dl/g measured in phenol/o-dichlorobenzene (weight ratio 1:1) at 25° C. in a Ubbelohde-viscosmeter.
3. Graft polymer, 80% graft base consisting of crosslinked polybutadiene (gel content of more than 70%, measured in toluene) and 20% graft coating material consisting of methyl methacrylate.
4. Mixture II consisting of 95% by weight of graft polymer according to 1.3 and 5% by weight of polytetrafluoroethylene having a fluorine content of 74% by weight.
5. Polytetrafluoroethylene (fluorine content 74% by weight).

II Production of the mixture of graft polymer and tetrafluoroethylene I.4. 100 parts of 40% by weight aqueous dispersion of the graft polymer I.3 and 3.5 parts of an aqueous tetrafluoroethylene dispersion, having a solids content of 60% by weight and a fluorine content (based on the solids material of 73.7% by weight, are mixed and stabilized with 1.8% by weight, based on polymer solids, of phenolic antioxidants. The mixture is coagulated at a temperature of from 85° to 95° C. and at a pH of from 4 to 5 with an aqueous solution of magnesium sulphate (bitter salt) and acetic acid, filtered and washed until free of electrolytes, then freed from the main quantity of water by centrifugation and then dried at 100° C. to produce a powder.

III Production and composition of the moulding compositions

The components are melted on a two-shaft extruder under a nitrogen atmosphere (c.f. following Table 1) and homogenised. The cylinder temperature is selected such that the composition temperature given in the Table is ensured. The extruded melt of the mixtures according to the invention is degased in front of the outlet of nozzle, cooled in water, granulated and dried. Processing is carried out on an injection moulding apparatus.

TABLE 1

| Example | Components [% by weight] | | | | | Composition temp. [°C.] | |
|---|---|---|---|---|---|---|---|
| | 1 | 2 | 3 | 4 | 5 | Extruder | Injection moulder |
| 1 (comparison) | 52 | 36 | 10 | — | — | 277 | 270 |
| 2 (comparison) | 51,5 | 36 | 9,5 | — | 0,5 | 277 | 270 |
| 3 | 52 | 36 | — | 10 | — | 278 | 270 |

The Vicat-B-temperature is determined according to DIN 54 450.

TABLE 2

| Example | Vicat B [°C.] |
|---|---|
| 1 Comparison | 119 |
| 2 Comparison | 119 |
| 3 | 125 |

We claim:

1. Thermoplastic moulding compositions comprising:
   A. from 1 to 99 parts by weight of polyalkylene terephthalate,
   B. 1 to 99 parts by weight of aromatic polycarbonate and
   C. from 1 to 30 parts by weight of additional polymer, characterised in that the polymer C consists of at least one polymer having a glass transition temperature below −20° C. and, based on the moulding compositions A+B+C, of from 0.015 to 0.8% by weight fluorinated polyolefin and is obtained by mutual coagulation by mixing together the aqueous dispersions of the fluorinated polyolefin and the polymer having a glass transition temperature below −20° C.

2. Moulding compositions according to claim 1, characterised in that they contain from 1 to 80 parts by weight of component A, from 20 to 99 parts by weight of component B and from 3 to 20 parts by weight of component C.

3. Moulding compositions according to claim 1, characterised in that they contain from 30 to 60 parts by weight of component A, from 40 to 70 parts by weight of component B and from 5 to 12 parts by weight of component C.

4. Moulding compositions according to claim 1, characterised in that polymer C consists of at least one polymer having a glass transition temperature below −20° C. and from 0.1 to 20% by weight, based on C, of fluorinated polyolefin.

5. Process for the production of the moulding compositions according to claim 1, according to which aqueous dispersions of at least one fluorinated polyolefin and at least one polymer having a glass transition temperature below −20° C. are firstly mixed, then coagulated together, isolated, dried and optionally mixed, after granulation or crushing, with the molten components A and B.

6. Moulded articles prepared from compositions of claim 1.

* * * * *